ent Office 3,734,912
Patented May 22, 1973

1

3,734,912
CERTAIN PYRIMIDO(1,2-a)(1,4)BENZODIAZEPIN-1(5H)-ONES
Arthur R. Hanze, deceased, by Janice W. Hanze, administratrix, Kalamazoo, Mich., assignor to The Upjohn Company, Kalamazoo, Mich.
No Drawing. Continuation-in-part of Ser. No. 47,602, June 18, 1970. This application May 4, 1971, Ser. No. 140,238
Int. Cl. C07d 57/12
U.S. Cl. 260—256.5 R                                     10 Claims

ABSTRACT OF THE DISCLOSURE 7-phenylpyrimido[1,2-a][1,4]benzodiazepin-1(5H)-one of the Formula IX:

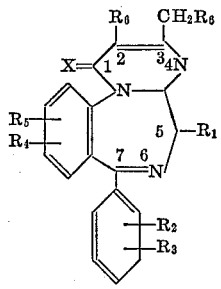

IX wherein $R_1$ is selected from the group consisting of hydrogen, alkyl, hydroxy and acetoxy; wherein $R_2$, $R_3$, $R_4$, and $R_5$ are selected from the group consisting of hydrogen, halogen, nitro, cyano, trifluoromethyl, sulfonamido, amino, lower-alkyl, -alkoxy, -alkylthio, -alkylsulfinyl, -alkylsulfonyl, -alkanoylamino and -dialkylamino; wherein $R_6$ is hydrogen, loweralkyl, phenyl and benzyl; and wherein X is oxygen, sulfur or =NH, are synthesized by condensing a 2-amino-5-phenyl-3H-1,4-benzodiazepine of the Formula I

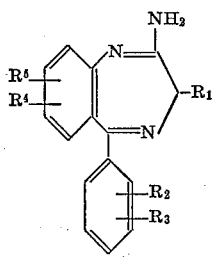

I wherein $R_1$, $R_2$, $R_3$, $R_4$, and $R_5$ are defined as above with a diketene of the formula

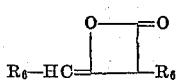

wherein $R_6$ is defined as above, and heating the thus produced N-acetoacetyl derivative to obtain the compounds of Formula IX, in which $R_1$ is hydrogen or lower alkyl, and X is oxygen. These compounds, as well as products in which X is sulfur and =NH, and $R_1$ is also hydroxy and acetoxy, and their pharmaceutically acceptable acid addition salts are useful tranquilizer for mammals.

CROSS REFERENCES TO RELATED APPLICATIONS

This application is a continuation-in-part of application S.N. 47,602, filed June 18, 1970 (now abandoned).

2

BACKGROUND OF THE INVENTION

Field of the invention

This invention is directed to new organic compounds and is particularly concerned with novel 7-phenylpyrimido [1,2-a][1,4]benzodiazepin-1(5H)-one (IX) and the process and intermediates therefor. The invention furthermore includes the pharmaceutically acceptable acid addition salts.

The novel compounds IX, intermediates, and the process of production thereof can be illustratively represented as follows:

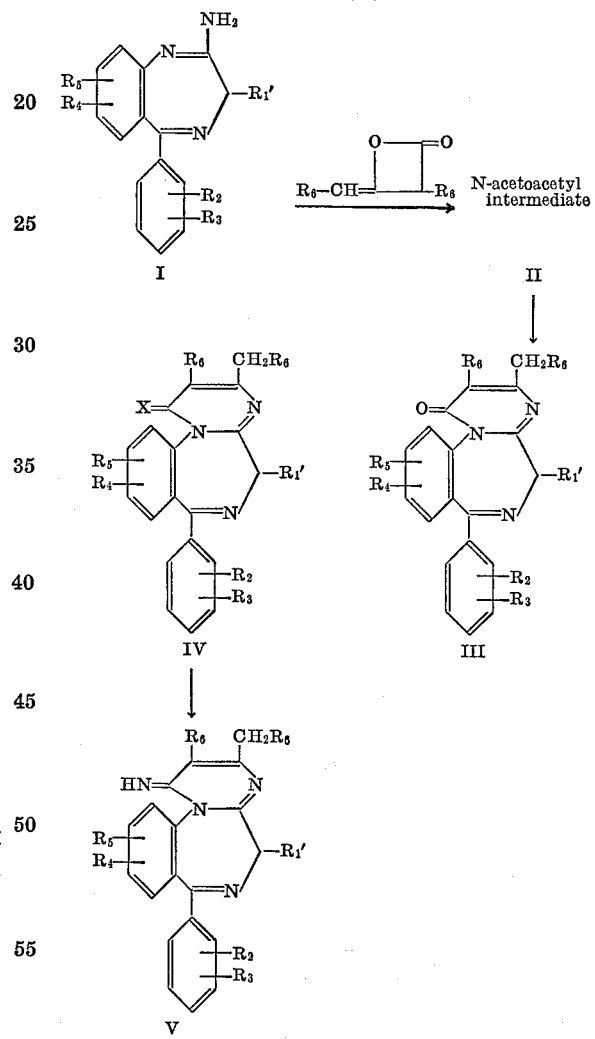

wherein $R_1'$ is hydrogen or alkyl of 1 to 3 carbon atoms, inclusive; wherein $R_2$, $R_3$, $R_4$, and $R_5$ are selected from the group consisting of hydrogen, halogen, nitro, cyano, trifluoromethyl, sulfonamido, amino, alkyl, alkoxy, alkylthio, alkylsulfinyl, alkylsulfonyl, alkanoylamino, dialkylamino in which the carbon moiety is of 1 to 3 carbon atoms per alkane radical; wherein $R_6$ is hydrogen, alkyl defined as above, phenyl or benzyl.

The products of Formula IX wherein $R_1$ is hydroxy and acetoxy can be made from these products III in which $R_1'$ is hydrogen by the following scheme B:

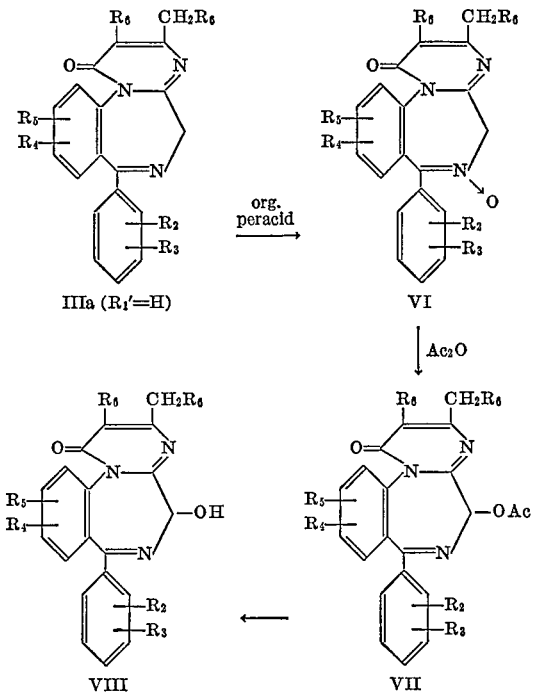

Scheme B wherein $R_2$, $R_3$, $R_4$, $R_5$ and $R_6$ are defined as above.

The compounds of Formulas VII and VIII can be converted to their corresponding thiones and imines as shown for compound III.

The process of scheme A comprises: treating a 2-amino-5-phenyl-3H-1,4-benzodiazepine (I) with diketene or alkyl substituted diketene to obtain the corresponding N-acetoacetyl intermediate (II), heating II to convert it to the corresponding 7-phenylpyrimido[1,2-a][1,4]benzodiazepin-1(5H)-one (III). If a thione (IV) is wanted compound III is reacted with phosphorus pentasulfide to give the corresponding 7 - phenylpyrimido[1,2-a][1,4]benzodiazepine-1(5H)-thione (IV) which by treatment with an ammoniacal lower alkanol gives the corresponding 7-phenylpyrimido[1,2-a][1,4]benzodiazepin-1(5H) - imine (V).

The compounds of Formula IX in which $R_1$ is acetoxy or hydroxy (scheme B) are produced by treating a compound of Formula III wherein $R_1'$ is hydrogen with an organic peracid to obtain the N-oxide (VI) which is treated with acetic anhydride to give the 5-acetoxy-7-phenylpyrimido[1,2-a][1,4]benzodiazepin - 1(5H) - one (VII). By hydrolysis the corresponding 5-hydroxy analog (VIII) is obtained.

In the same manner as shown with compound III, the 1-thione and 1-imine derivatives can be obtained from compounds VII and VIII.

DESCRIPTION OF THE PREFERRED EMBODIMENT

Lower alkyl groups of 1 to 3 carbon atoms, inclusive, are exemplified by methyl, ethyl, propyl and isopropyl.

The carbon chain moiety of alkoxy, alkylthio, alkylsulfinyl, alkylsulfonyl, dialkylamino of 1 to 3 carbon atoms, inclusive, is defined as alkyl of 1 to 3 carbon atoms, inclusive, above.

The alkanoylamino group with an alkane radical of 1 to 3 carbon atoms consists of formamido

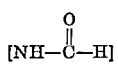

acetamido and propionamido.

The term halogen includes fluorine, chlorine, bromine and iodine.

Compounds III, IIIa, IV, V, VII and VIII are subclasses of the compound of the generic Formula IX:

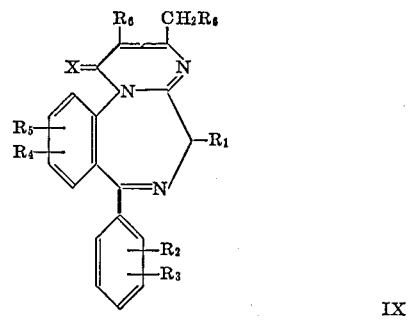

IX wherein $R_1$ is hydrogen, alkyl of 1 to 3 carbon atoms, inclusive, hydroxy or acetoxy; wherein $R_2$, $R_3$, $R_4$ and $R_5$ are hydrogen, halogen, nitro, cyano, trifluoromethyl, sulfonamido, amino, alkyl, alkoxy, alkylthio, alkylsulfinyl, alkylsulfonyl, alkanoylamino or dialkylamino in which the carbon moiety is of 1 to 3 carbon atoms, inclusive, per alkane radical; wherein $R_6$ is hydrogen, alkyl defined as above, phenyl or benzyl; and wherein X is oxygen, sulfur or =NH.

The pharmacological acceptable acid addition salts of compound IX are also part of this invention.

The novel compounds of the Formula IX including acid addition salts thereof have sedative, tranquilizing and muscle relaxant effects in mammals and birds.

The acid addition salts of compounds of Formula IX contemplated in this invention, are the hydrochlorides, hydrobromides, hydriodide, sulfates, phosphates, cyclohexanesulfamates, methanesulfonates, ethanesulfonates, benzenesulfonates, toluenesulfonates and the like, prepared by reacting a compound of Formula IX with the stoichiometrically calculated amount of the selected pharmacologically acceptable acid.

The sedative tranquilizing effects of 9-chloro-3-methyl-7-phenylpyrimido[1,2-a][1,4]benzodiazepin-1 (5H)-one are shown by the following tests in mice:

Chimney test: [Med. Exp. 4, 11 (1961)]: The effective intraperitoneal dosage for 50% of mice ($ED_{50}$) is 0.32 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 0.14 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 0.32 mg./kg.

Nicotine antagonism test: Mice in a group of 6 are injected with the test compound, 9-chloro-3-methyl-7-phenylpyrimido[1,2-a]$_2$1,4]benzodiazepin - 1 - (5H)-one. Thirty minutes later the mice including control (untreated) mice are injected with nicotine salicylate (2 mg./kg.). The control mice show overstimulation, i.e., (1) running convulsions followed by (2) tonic extensor fits: followed by (3) death. An intraperitoneal dosage of 0.14 mg./kg. of the test compound protected 50% of the mice against (2) and (3) ($ED_{50}$).

Antagonism to strychnine (as sulfate): The effective dosage $ED_{50}$ of 9-chloro-3-methyl-7-phenylpyrimido [1,2-a][1,4]benzodiazepin-1(5H)-one is 1.8 mg./kg. orally in mice. The test consists in orally administrating into groups of 6 mice the test compound, 9-chloro-3- methyl-7-phenylpyrimido [1,2 - a][1,4]benzodiazepin-1 (5H)-one, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

For 9-chloro - 3 - methyl-7-(o-chlorophenyl)pyrimido [1,2-a][1,4]-benzodiazepin-1[5H]-one the following $ED_{50}$ values were found:

| Tests | Chimney | Dish | Pedestal | Nicotine (2) | Nicotine (3) | Strychnine |
|---|---|---|---|---|---|---|
| $ED_{50}$ (mg./kg.)g | .23 | .23 | .20 | .018 | .023 | .78 |

NOTE.—Nicotine (2)=Antagonism to nicotine tonic extensor fits; Nicotine (3)=Death protection from nicotine.

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds food premixes, with starch, oatmeal, dried fishmeat, fishmeal, flour and the like can be prepared.

As tranquilizer the compounds of Formula IX can be used in dosages of 0.01 mg.–2.0 mg./kg. in oral or injectable preparations as described above, to alleviate tension and anxiety in mammals, or birds, such as e.g., occurs when animals are in travel.

Other acid addition salts of the compounds of Formula IX can be made such as the fluosilicic acid addition salts which are useful mothproofing compounds or the trichloroacetates useful as herbicides against Johnson grass, Bermuda grass, yellow foxtail and green foxtail, and quack grass.

The starting compound used in this invention is 2-amino-5-phenyl-3H-1,4-benzodiazepines (I). These amines I are prepared from the well-known 1,3-dihydro-5-phenyl-2H[1,4]benzodiazepine-2-thiones[Archer et al., J. Org. Chem. 29, 231 (1964) and U.S. Pat. 3,422,091] by treatment with ammonia in methanol. Details of this reaction are shown in Preparation 1 and in Example 3.

Representative 2-amino compounds of Formula I thus produced include:

2-amino-5-phenyl-3H-1,4-benzodiazepine;
2-amino-7-chloro-5-phenyl-3H-1,4-benzodiazepine;
2-amino-6-chloro-5-(m-bromophenyl)-3H-1,4-benzodiazepine;
2-amino-8-chloro-5-phenyl-3H-1,4-benzodiazepine;
2-amino-7-bromo-5-phenyl-3H-1,4-benzodiazepine;
2-amino-7-chloro-5-(3,4-dimethylphenyl)-3H-1,4-benzodiazepine;
2-amino-5-(2-methyl-4-methoxyphenyl)-3H-1,4-benzodiazepine;
2-amino-9-bromo-5-phenyl-3H-1,4-benzodiazepine;
2-amino-7-methyl-5-phenyl-3H-1,4-benzodiazepine;
2-amino-7-nitro-5-phenyl-3H-1,4-benzodiazepine;
2-amino-7-fluoro-5-phenyl-3H-1,4-benzodiazepine;
2-amino-7-trifluoromethyl-5-phenyl-3H-1,4-benzodiazepine;
2-amino-9-trifluoromethyl-5-[p-(propionylamino)phenyl]-3H-1,4-benzodiazepine;
2-amino-7-cyano-5-phenyl-3H-1,4-benzodiazepine;
2-amino-8-cyano-5-[p-(trifluoromethyl)phenyl]-3H-1,4-benzodiazepine;
2-amino-7-chloro-5-(o-chlorophenyl)-3H-1,4-benzodiazepine;
2-amino-6-ethylthio-5-(o-bromophenyl)-3H-1,4-benzodiazepine;
2-amino-6,8-dichloro-5-(o-fluorophenyl)-3H-1,4-benzodiazepine;
2-amino-8-propoxy-7-bromo-5-[m-(ethylsulfinyl)phenyl]-3H-1,4-benzodiazepine;
2-amino-9-diisopropylamino-7-methyl-5-[m-(propylsulfonyl)phenyl]3H-1,4-benzodiazepine;
2-amino-7-bromo-5-(o-fluorophenyl)-3H-1,4-benzodiazepine;
2-amino-3-methyl-5-(o-fluorophenyl)-3H-1,4-benzodiazepine;
2-amino-7-iodo-5-(o-fluorophenyl)-3H-1,4-benzodiazepine;
2-amino-7-chloro-5-(2,6-difluorophenyl)-3H-1,4-benzodiazepine;
2-amino-7-trifluoromethyl-5-phenyl-3H-1,4-benzodiazepine;
2-amino-3-methyl-5-(p-fluorophenyl)-3H-1,4-benzodiazepine;
2-amino-7-nitro-5-(o-iodophenyl)-3H-1,4-benzodiazepine;
2-amino-8-amino-5-(o-chlorophenyl)-3H-1,4-benzodiazepine;
2-amino-7-bromo-5-(o-bromophenyl)-3H-1,4-benzodiazepine;
2-amino-7-methylsulfinyl-5-(o-fluorophenyl)-3H-1,4-benzodiazepine;
2-amino-7-methyl-5-(o-chlorophenyl)-3H-1,4-benzodiazepine;
2-amino-7-methylthio-5-phenyl-3H-1,4-benzodiazepine;
2-amino-7-cyano-5-(o-chlorophenyl)-3H-1,4-benzodiazepine;
2-amino-3,6,8-trimethyl-5-(o-chlorophenyl)-3H-1,4-benzodiazepine;
2-amino-9-propylsulfonyl-7-methyl-5-phenyl-3H-1,4-benzodiazepine;
2-amino-7-trifluoromethyl-5-(o-chlorophenyl)-3H-1,4-benzodiazepine;
2-amino-7-dimethylamino-5-phenyl-3H-1,4-benzodiazepine;
2-amino-7-fluoro-5-(o-chlorophenyl)-3H-1,4-benzodiazepine;
2-amino-7,8-dicyano-5-[p-(methylsulfonyl)phenyl]-3H-1,4-benzodiazepine;
2-amino-6,9-dichloro-5-(p-isopropylphenyl)-3H-1,4-benzodiazepine;
2-amino-6-methoxy-5-(2,4-diethoxyphenyl)-3H-1,4-benzodiazepine;
2-amino-9-sulfonamido-5-[p-(trifluoromethyl)phenyl]-3H-1,4-benzodiazepine;
2-amino-6,8-diethyl-5-(m-ethylphenyl)-3H-1,4-benzodiazepine;
2-amino-6-nitro-5-(o-cyanophenyl)-3H-1,4-benzodiazepine;
2-amino-7,9-bis(dipropylamino)-5-(o-nitrophenyl)-3H-1,4-benzodiazepine;
2-amino-9-acetylamino-5-(p-cyanophenyl)-3H-1,4-benzodiazepine;

and the like.

In carrying out the process of the invention, a selected 2-amino-5-phenyl-3H-1,4-benzodiazepine (I) is reacted in an inert organic solvent diketene or substituted diketene (4-alkylidene-3-alkyl-2-oxetanone). Solvents useful in this reaction are tetrahydrofuran, acetone, diethylether, dipropylether, dibutylether, cyclohexane, pentane, hexane, heptane, mixtures thereof and the like. The 4-alkylidene- 3($R_6$)-2-oxetanones (diketenes) useful in this reaction have the formula:

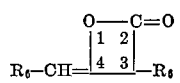

wherein $R_6$ is hydrogen or an alkyl group of 1 to 3 carbon atoms, inclusive, phenyl and benzyl.

The reaction can be carried out between 0° and 50°, preferably at between 10° and 30° C. in tetrahydrofuran. The reagents, benzodiazepines and diketenes, are used in about equimolar quantities to about 200% stochiometrically calculated excess of diketene. The reaction time at room temperature is between 4 hours and 72 hours. After the reaction is terminated which can be determined by thin layer chromatography (e.g. with silica gel-methanol: toluene 1:9), the product, a N-acetoacetyl intermediate (II) is recovered by conventional means, such as concentrating the solution. The solids are then purified by standard procedures e.g. crystallization, chromatography, extraction or the like.

Compound II is converted to compound III, a 3-alkyl-7 - phenylpyrimido[1,2-a][1,4]benzodiazepin - (5H)-one by heat. It can be heated up to the melting point to give III. Preferably, however, compound II in a high boiling hydrocarbon solvent is heated to reflux for 1 to 24 hours. Such hydrocarbon solvents are selected from the group consisting of toluene, xylenes and ethylbenzene, or the like. Compounds of Formula III are recovered by conventional means, such as concentrating the solution, chromatography (etc.). Recrystallization from solvents e.g. Skellysolve B hexanes, heptane, cyclohexane, ethyl acetate mixtures thereof and the like give pure material III.

The compounds of Formula III can be converted to the corresponding 3 - alkyl-7-phenylpyrimido[1,2-a][1,4]benzodiazepine-1(5H)-thione (IV) by the method of G. A. Archer et al. [U.S. Pat. 3,422,091] i.e. by heating the ketone in pyridine with phosphorous pentasulfide for about 1 to 24 hours.

The thiones IV are converted to the corresponding 3-alkyl-7-phenylpyrimido[1,2-a][1,4]benzodiazepin-1(5H)-imine (V) by stirring for 1 to 6 hours the thiones of Formula IV in an ammoniacal alkanol solution, usually methanol or ethanol saturated with ammonia.

Compounds of Formula IX with a 5-hydroxy or acyloxy substituent are produced from compounds of Formula IIIa ($R_1'$=H). A selected compound of Formula IIIa is treated in the cold, —20° to +20° C., with an organic peracid. In the preferred embodiment of this invention the peracid is used in a solvent such as methanol, ethanol, ether, tetrahydrofuran and the like. As peracids, peracetic, performic, perpropionic, perbenzoic m-chloroperbenzoic, pertoluic acid or the like can be used in equimolar to 3–4 equimolar quantity. The reaction period is from 2–24 hours in an icebath followed by 2–24 hours at room temperature. The thus obtained 3 - alkyl-7-phenylpyrimido-[1,2-a][1,4]benzodiazepin-1[5H]-one 6 - oxide VI is recovered from the mixture by conventional procedures, e.g. concentration of the mixture, extraction and evaporation of the extracts.

The thus-obtained N-oxide (VI) is treated with acetic anhydride, usually in a solvent such as acetic acid. The reaction is performed at elevated temperature 60–120° C., preferably on a steam bath. The product, a 5-hydroxy-3-alkyl - 7 - phenylpyrimido[1,2-a][1,4]benzodiazepin-1[5H]-one acetate (VII), is recovered by standard methods such as concentration, extraction, chromatography and combinations thereof.

The free hydroxy compound, 5-hydroxy-3-alkyl-7-phenylpyrimido[1,2-a][1,4]benzodiazepin - 1[5H]-one (VIII) is produced by a conventional base hydrolysis e.g. methanol, ethanol or the like in the presence of a base e.g. sodium or potassium hydroxide or carbonate. Compound VIII is obtained from the methods, such as concentration, extraction or the like.

Both compounds VII and VIII can be converted from their 3-ketone forms to the thiones and imines as discussed for compound III above.

The following preparations and examples are illustrative of the processes and products of the present invention, but are not to be construed as limiting.

PREPARATION 1

2-amino-7-chloro-5-phenyl-3H-1,4-benzodiazepine

A solution of 2.87 g. (10 millimoles) of 7-chloro-1,3-dihydro-5-phenyl-2H-1,4 - benzodiazepine-2-thione in 50 ml. of methanol saturated with ammonia gas was stirred at 24–26° C. (room temperature) for 2½ hours. Crystallization occurred during stirring. The crystals of 2-amino-7-chloro-5-phenyl-3H-1,4-benzodiazepine were recovered by filtration and dried, yield 1.55 g. (57.5%) of melting point 236–237° C.

Analysis.—Calcd. for $C_{15}H_{12}ClN_3$ (percent): C, 66.79; H, 4.49; Cl, 13.15; N, 15.57. Found (percent): C, 66.97; H, 4.53; Cl, 13.15; N, 15.49.

In the manner given above (Preparation 1) other 2-thiones are treated with ammoniacal methanol to give the corresponding 2-amino-5-phenyl-3H-1,4-benzodiazepines.

PREPARATION 2

1,3-dihydro-7-chloro-5-(2,6-difluorophenyl)-2H-1,4-benzodiazepin-2-one (A) 4-chloro-2-(2',6'-difluorobenzoyl)acetanilide To a solution of 114 g. (1.0 mole) of m-difluorobenzene in 800 ml. of dry tetrahydrofuran, cooled to —50° C. and maintained under a nitrogen atmosphere, was added, with stirring, 320 ml. of an n-heptane solution of n-butyllithium containing 1.0 mole of the latter. The addition was carried out during 50 minutes and was followed by stirring 2 hours more at —50° C. The cold solution was then added with stirring during 50 minutes to a solution of 187.8 g. (0.97 mole) of 6-chloro-2-methyl-4H-3,1-benzoxazin-4-one [J. Am. Chem. Soc. 70, 2423 (1948)] in 1400 ml. of benzene and 1000 ml. of tetrahydrofuran at 25° C. The mixture was stirred under a nitrogen atmosphere for 20 hours, at which time 1000 ml. of 2 N hydrochloric acid was added. The aqueous layer was separated and discarded. The organic layer was filtered to remove suspended solid material and the filtrate was washed with cold, dilute aqueous sodium hydroxide solution. Three layers were present, a light colored aqueous phase, a dark brown aqueous phase, and an organic phase. The organic phase, after being dried over anhydrous sodium sulfate, was concentrated to give 101 g. of a semi-solid which was then extracted with 2100 ml. of hot Skellysolve B hexanes. Evaporation of the extract gave 39.9 g. of crude product of melting point 106°–116° C. Recrystallization of this material from Skellysolve B hexanes gave purified 4-chloro-2-(2',6'-difluorobenzoyl)acetanilide of melting point 118°–120° C.

Analysis.—Calcd. for $C_{15}H_{10}ClF_2NO_2$ (percent): C, 58.17; H, 3.24; Cl, 11.45; F, 12.27; N, 4.52. Found (percent): C, 58.11; H, 3.38; Cl, 11.53; F, 12.24; N, 4.20.

(B) 2-amino-5-chloro-2',6'-difluorobenzophenone

A suspension of 4.2 g. (0.014 mole) of 4-chloro-2-(2',6'-difluorobenzoyl)acetanilide in 350 ml. of concentrated hydrochloric acid and 350 ml. of water was heated on a steam bath with stirring and in a nitrogen atmosphere until complete solution resulted. The solution was cooled and basified with 50% aqueous sodium hydroxide solution. The resulting solid was removed by extraction with methylene chloride. The extract was dried with anhydrous sodium sulfate and evaporated to dryness. The residue was recrystallized from cyclohexane to give 2.4 g. of 2-amino-5-chloro-2',6'-difluorobenzophenone of melting point 103°–105° C.

*Analysis.*—Calcd. for C₁₃H₈ClF₂NO (percent): C, 58.33; H, 3.01; Cl, 13.24; F, 14.20; N, 5.23. Found (percent): C, 58.33; H, 3.29; Cl, 13.31; F, 14.87; N, 5.14.

(C) 2-(2-bromoacetamido)-5-chloro-2′,6′-difluorobenzophenone

To a solution of 2.7 g. (0.01 mole) of 2-amino-5-chloro-2′,6′-difluorobenzophenone in 100 ml. of benzene, through which a rapid stream of nitrogen was passed, was added 3.03 g. (0.015 mole) of bromoacetyl bromide. A precipitate formed soon after the addition was complete. The benzene was removed by evaporation and the solid residue was crystallized from cyclohexane to yield 3.4 g. of 2 - (2-bromoacetamido)-5-chloro-2′,6′-difluorobenzophenone of melting point 146°–147.5° C.

*Analysis.*—Calcd. for C₁₅H₉BrClF₂NO₂ (percent): C, 46.36; H, 2.33; Br, 20.56; Cl, 9.12; F, 9.78; N, 3.60. Found (percent): C, 46.46; H, 2.48; Br, 20.68; Cl, 9.21; F, 9.49; N, 3.82.

(D) 2-(aminoacetamido)-5-chloro-2′,6′-difluorobenzophenone

Liquid ammonia (350 ml.) was added to a solution of 26 g. (0.067 mole) of 2-(2-bromoacetamido)-5-chloro-2′,6′-difluorobenzophenone in 350 ml. of methylene chloride. The solution was stirred under reflux for 5 hours and was then stirred for about 16 hours while excess ammonia evaporated. The methylene chloride solution was filtered to remove solid material and was then evaporated to dryness. The residue was recrystallized from 2 l. of cyclohexane to yield 19.5 g. of 21-(2-aminoacetamido)-5-chloro-2′,6′-difluorobenzophenone of melting point 133°–135° C.

*Analysis.*—Calcd. for C₁₅H₁₁ClF₂N₂O₂ (percent): C, 55.48; H, 3.42; Cl, 10.92; F, 11.70; N, 8.63. Found (percent): C, 56.69; H, 3.99; Cl, 11.19; F, 11.06; N, 8.34.

(E) 1,3-dihydro-7-chloro-5-(2,6-difluorophenyl)-2H-1,4-benzodiazepin-2-one

A solution of 21.0 g. (0.065 mole) of 2-(2-aminoacetamido)-5-chloro-2′,6′-difluorobenzophenone in 300 ml. of pyridine was heated under reflux in a nitrogen atmosphere for 18 hours. The pyridine was removed by evaporation. The residue after being washed with Skellysolve B hexanes was recrystallized, first from ethyl acetate-Skellysolve B hexanes and then from ethyl acetate. There was thus obtained a first crop (11.7 g.; melting point 248°–249° C.) and a second crop (2.3 g.; melting point 244°–246° C.) of 1,3-dihydro-7-chloro-5-(2,6-difluorophenyl)-2H-1,4-benzodiazepin-2-one.

*Analysis.*—Calcd. for C₁₅H₉ClF₂N₂O (percent): C, 58.74; H, 2.96; Cl, 11.56; F, 12.39; N, 9.14. Found (percent): C, 58.89; H, 2.78; Cl, 11.39; F, 11.72; N, 8.95.

This material was found to contain 1.9% ethyl acetate of solvation. Recrystallization of the solvated material from ethanol provides unsolvated 1,3-dihydro-7-chloro-5-(2,6-difluorophenyl)-2H-1,4-benzodiazepin-2-one.

PREPARATION 3

1,3-dihydro-7-chloro-5-(2,6-difluorophenyl)-2H-1,4-benzodiazepine-2-thione

A solution of 7.65 g. (0.025 mole) of 1,3-dihydro-7-chloro-5-(2,6-difluorophenyl) - 2H-1,4-benzodiazepin-2-one in 500 ml. of pyridine was treated with 5.55 g. (0.025 mole) of phosphorus pentasulfide and heated under reflux in a nitrogen atmosphere for two hours. The pyridine (350 ml.) was removed in vacuo and the thus-produced residue was poured onto crushed ice. The aqueous phase was extracted with methylene chloride and then discarded. The extract was washed successively with three 200-ml. portions of water and 100 ml. of brine, and dried over anhydrous sodium sulfate. Removal of the solvent gave 7.0 g. of solid which was recrystallized from ethanol-water to give in 2 crops 6.8 g. of crude material which, after recrystallization from ethanol-water, gave pure 1,3-dihydro-7-chloro-5-(2,6-diffuorophenyl) - 2H - 1,4-benzodiazepine-2-thione of melting point 222.5°–224° C.

*Analysis.*—Calcd. for C₁₅H₉ClF₂N₂S (percent): C, 55.82; H, 2.81; Cl, 10.98; F, 11.77; N, 8.68; S, 9.93. Found (percent): C, 56.13; H, 2.68; Cl, 11.13; F, 11.69; N, 8.40; S, 9.84.

PREPARATION 4

1,3-dihydro-7-(trifluoromethyl)-5-phenyl-2H-1,4-benzodiazepine-2-thione

A stirred mixture of 1,3-dihydro-7-trifluoromethyl-5-phenyl-2H-1,4-benzodiazepin-2-one (89.7 g.; 0.294 mole), dry pyridine (2300 ml.) and phosphorus pentasulfide (72.4 g.; 0.323 mole) was refluxed under nitrogen for 30 minutes, cooled and concentrated in vacuo. A suspension of the residue in ice water was extracted with methylene chloride. The extract was dried over anhydrous potassium carbonate and concentrated. The residue was crystallized from methylene chloride-ethanol to give 43.2 g. of melting point 228.5°–229° C. (dec.) and 17.8 g. of melting point 229°–230° C. (dec.) (64.5%) of 1,3-dihydro - 7 - (trifluoromethyl) - 5 - phenyl-2H-1,4-benzodiazepine-2-thione. The analytical sample prepared by recrystallization from methylene chloride-ethanol had a melting point of 223.5° C. (dec.).

*Analysis.*—Calcd. for C₁₆H₁₁F₃N₂S (percent): C, 60.00; H, 3.46; F, 17.79; N, 8.75; S, 10.01. Found (percent): C, 59.85; H, 3.73; F, 17.83; N, 8.42; S, 10.26.

EXAMPLE 1

9-chloro-3-methyl-7-phenylpyrimido[1,2-a][1,4]benzodiazepin-1(5H)-one (A) N-acetoacetyl intermediate II (of Example 1)

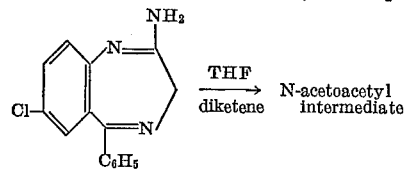

A solution of 1.35 g. (5.0 millimoles) of 2-amino-7-chloro-5-phenyl-3H-[1,4]benzodiazepine and 0.50 g. (6.0 millimoles) of distilled diketene in 25 ml. of tetrahydrofuran was stirred at room temperature (23–25° C.) for four hours. An additional 300 mg. of diketene was added and the mixture refrigerated for two days at 9–10° C. The solution was concentrated to dryness and crystallized from ethyl acetate to yield 1.15 g. (65%) of N-acetoacetyl intermediate II (of Example I) of melting point 150° C. dec.

*Analysis.*—Calcd. for C₁₉H₁₆ClN₃O₂ (percent): C, 64.50; H, 4.56; Cl, 10.02; N, 11.88. Found (percent): C, 64.23; H, 4.47; Cl, 10.48; N, 12.21.

(B) 9-chloro-3-methyl-7-phenylpyrimido[1,2-a]benzodiazepine-1(5H)-one

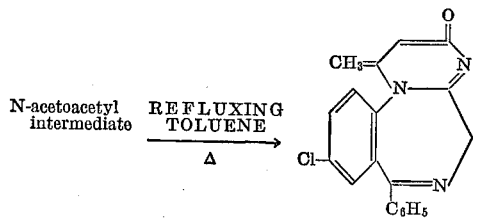

A solution of 1.5 g. of N-acetoacetyl intermediate II (of Example I) in 75 ml. of toluene was refluxed for 2½ hours and then stirred at room temperature (22–25° C.) overnight. The solid which crystallized out was filtered off; yield 600 mg. of 2-amino-7-chloro-5-phenyl-3H[1,4]benzodiazepine, formed by hydrolysis or pyrolysis of starting material.

From the mother liquors of the reaction mixture was isolated by crystallization from ethyl acetate 310 mg. of 9 - chloro - 3 - methyl - 7 - phenylpyrimido[1,2-a][1,4]benzodiazepin-1(5H)-one. Recrystallization from ethyl acetate-Skellysolve B hexanes gave 175 mg. of analytically pure material with a melting point of 193–194° C.

Analysis.—Calcd. for $C_{19}H_{14}ClN_3O$ (percent): C, 67.96; H, 4.20; Cl, 10.56; N, 12.51. Found (percent): C, 67.21; H, 4.64; Cl, 10.20; N, 9.82.

Ultraviolet: $\lambda_{max.}$ 27, $\epsilon$ 41,800; $\lambda_{max.}$ 253 (sh.), $\epsilon$ 12,300; $\lambda_{max.}$ 293 (sl. sh.), $\epsilon$ 10,000.

EXAMPLE 2

9-chloro-3-methyl-7-phenylpyrimido[1,2-a][1,4]benzodiazepine-1(5H)-thione

A stirred mixture of 800 mg. of 9-chloro-3-methyl-7-phenylpyrimido[1,2-a][1,4]benzodiazepine - 1 (5H) - one in 40 ml. of dry pyridine and 690 mg. of phosphorus pentasulfide was refluxed under nitrogen for 28 hours, cooled and concentrated.

A suspension of the residue in ice water was extracted with methylene chloride and washed with water. The extract was dried over anhydrous sodium sulfate and concentrated. The residue was crystallized from ethyl acetate to give 290 mg. of 9-chloro-3-methyl-7-phenylpyrimido[1,2-a][1,4]benzodiazepine - 1(5H) - thione. M.P. 207° C. (d.).

EXAMPLE 3

9-chloro-3-methyl-7-phenylpyrimido[1,2-a][1,4]benzodiazepin-1(5H)-imine

A solution of 1.0 g. of 9-chloro-3-methyl-7-phenylpyrimido[1,2-a][1,4]benzodiazepine - 1 - (5H) - thione in 20 ml. of methanol saturated with ammonia gas was stirred at about 24° C. for 3 hours. The reaction mixture was evaporated in vacuo (10 mm. Hg) and the product recrystallized from methanol to give 9-chloro-methyl-7-phenylpyrimido[1,2-a][1,4]benzodiazepin -(5H) - imine.

EXAMPLE 4

9-chloro-3-methyl-7-phenylpyrimido[1,2-a][1,4]benzodiazepin-1(5H)-one-6-oxide

A stirred solution of 9-chloro-3-methyl-7-phenylpyrimidol[1,2-a][1,4]benzodiazepin-1(5H)-one (1.0 g.; 3.0 millimoles) in absolute ethanol in an ice bath was treated with m-chloroperbenzoic acid (1.0 g.; 6.0 millimoles). The mixture was allowed to stand in the ice bath for 8 hours and at room temperature, about 24° C., for 18 hours. It was then concentrated in vacuo, the residue suspended in aqueous, cold, dilute potassium carbonate solution and extracted with methylene chloride. The extract was washed with water, dried and concentrated in vacuo.

The residue was chromatographed on 100 g. of silica gel (taking) 50 ml. fractions. The desired product was eluted in fractions 50–70 using 10% MeOH–90% EtOAc. The product 9-chloro-3-methyl-7-phenylpyrimido[1,2-a]-[1,4]benzodiazepin-1(5H)-one-6-oxide of melting point 196–200° C. was isolated by concentration of the chromatographic fraction.

Analysis.—Calcd. for $C_{19}H_{14}ClN_3O_2$ (percent): C, 64.86; H, 4.01; Cl, 10.08; N, 11.94. Found (percent): C, 63.94; H, 3.78; Cl. 10.13; N, 10.91.

EXAMPLE 5

9-chloro-5-hydroxy-3-methyl-7-phenylpyrimido[1,2-a][1,4]benzodiazepin-1(5H)-one acetate A stirred mixture of 9-chloro-3-methyl-7-phenylpyrimido[1,2-a][1,4]benzodiazepin-1(5H)-one-6-oxide (704 mg.; 2.0 mmoles), acetic anhydride (4.0 ml.) and acetic acid (2.5 ml.) was warmed on the steam bath, under nitrogen, for 30 minutes and concentrated in vacuo. The residue was suspended in water, neutralized with sodium carbonate and extracted with methylene chloride. The extract was dried, concentrated and chromatographed on silica gel eluting with ethyl acetate to yield 9-chloro-5-hydroxy - 3 - methyl-7-phenylpyrimido[1,2-a][1,4]benzodiazepin-1(5H)-one acetate.

EXAMPLE 6

9-chloro-5-hydroxy-3-methyl-7-phenylpyrimido[1,2-a][1,4]benzodiazepin-1(5H)-one

A stirred suspension of 9-chloro-5-hydroxy-3-methyl-7β - phenylpyrimido[1,2-a][1,4]benzodiazepin - 1(5H)-one acetate (394 mg.; 1 millimole) in absolute ethanol (25 ml.), under nitrogen, was stirred for 3 hours at room temperature (23° C.) with 2.2 ml. of 0.5 N aqueous sodium hydroxide, poured into water and extracted with methylene chloride. The extract was dried and concentrated and the residue chromatographed on silica gel, eluting with ethyl acetate to yield 200 mg. 9-chloro-5-hydroxy - 3 - methyl-7-phenylpyrimido[1,2-a][1,4]benzodiazepin-3(5H)-one.

EXAMPLE 7

9-chloro-3-methyl-7-(o-chlorophenyl)pyrimido[1,2-a][1,4]benzodiazepin-1(5H)-one (A) 2-amino-7-chloro-5-(o-chlorophenyl)-3H-1,4-benzodiazepine A solution of 5.0 g. of 7-chloro-1,3-dihydro-5-(o-chlorophenyl)-2H-1,4-benzodiazepine-2-thione in 60 ml. of methanol saturated with ammonia was stirred at room temperature for 4 hours. The solution became clear and crystallization occurred after 1–1½ hours. The mixture was filtered, washed with methanol and dried, yielding 3.14 g. of 2-amino-7-chloro-5-(o-chlorophenyl-3H-1,4-benzodiazepine of melting point 221–230° C. A second crop (670 mg.) was obtained from the mother liquors.

Recrystallization of the main crop from 95% ethanol gave an analytical sample of melting point 226–230° C.

Analysis.—Calcd. for $C_{15}H_{11}Cl_2N_3$ (percent): C, 59.23; H, 3.65; Cl, 23.31; N, 13.81. Found (percent): C, 58.72; H, 3.83; Cl, 22.98; N, 13.15.

(B) N-acetoacetyl intermediate II (of Example 7)

A slurry of 608 mg. (2 millimoles) of 2-amino-7-chloro-5-(o-chlorophenyl-3H-1,4-benzodiazepine in 20 ml. of tetrahydrofuran was treated with 840 mg. (10 millimoles) of diketene. The solid dissolved after approximately 30 minutes. The reaction was allowed to proceed for 90 minutes and set in the refrigerator overnight. The solution was then concentrated to dryness, taken up in ethyl acetate, clarified and concentrated to a syrup which was used in the next step.

(C) 9-chloro-3-methyl-7-(o-chlorophenyl)pyrimido[1,2-a][1,4]benzodiazepin-1(5H)-one A solution of 420 mg. of N-acetoacetyl intermediate II (of Example 7) was refluxed in 20 ml. of dry toluene for 2 hours and 40 minutes and then held at room temperature (22–24° C.) overnight. The solution was then refluxed for an additional three and one-half hours. The mixture was concentrated to dryness and a small amount of 2-amino-7-chloro-5-(o-chlorophenyl)-3H-[1,4]benzodiazepine was removed by crystallization from toluene.

The filtrate was concentrated to give 340 mg. of a brown syrup, which was chromatographed on 50 g. of silica gel, taking 10 ml. fractions of 1:1 ethyl acetate-Skellysolve B hexanes. Fractions 48–53 were combined and crystallization from ethyl acetate gave 85 mg. of analytically pure product melting at 198–200° C.

Analysis.—Calcd. for $C_{19}H_{13}Cl_2N_3O$ (percent): C, 61.62; H, 3.54; Cl, 19.15; N, 11.35. Found (percent): C, 61.57; H, 3.72; Cl, 18.92; N, 10.90.

EXAMPLE 8

9-nitro-3-methyl-7-phenylpyrimido[1,2-a][1,4]benzodiazepin-1(5H)-one (A) N-acetoacetyl intermediate II (of Example 8)

In the manner given in Example 1A, 2-amino-7-nitro-5-phenyl-3H-1,4-benzodiazepine and diketene in tetrahydrofuran was reacted at room temperature to give N-acetoacetyl intermediate II (of Example 8).

(B) 9-nitro-3-methyl-7-phenylpyrimido[1,2-a][1,4]benzodiazepin-1(5H)-one

In the manner given in Example 1B, N-acetoacetyl intermediate (of Example 8) was condensed by refluxing in toluene to give 9-nitro-3-methyl-7-phenylpyrimido[1,2-a][1,4]benzodiazepin-1(5H)-one of melting point 232.5–234° C.

EXAMPLE 9

9-fluoro-3-methyl-7-phenylpyrimido[1,2-a][1,4]benzodiazepin-1(5H)-one (A) N-acetoacetyl intermediate II (of Example 9)

In the manner given in Example 1A, 2-amino-7-fluoro-5-phenyl-3H-1,4-benzodiazepine and diketene in tetrahydrofuran was reacted at room temperature to give N-acetoacetyl intermediate II (of Example 9).

(B) 9-fluoro-3-methyl-7-phenylpyrimido[1,2-a][1,4]benzodiazepin-1(5H)-one

In the manner given in Example 1B, N-acetoacetyl intermediate II (of Example 9) was condensed by refluxing in tolene to give 9-fluoro-3-methyl-7-phenylpyrimido[1,2-a][1,4]benzodiazepin-1(5H)-one.

EXAMPLE 10

9-chloro-3-ethyl-2-methyl-7-(2,6-difluorophenyl)-pyrimido[1,2-a][1,4]benzodiazepin-1(5H)-one (A) N-acetoacetyl intermediate II (of Example 10)

In the manner given in Example 1A, 2-amino-7-chloro-5-(2,6-difluorophenyl)-3H-1,4-benzodiazepine and 4-ethylidene-3-methyl-2-oxetanone in tetrahydrofuran was reacted at room temperature to give N-acetoacetyl intermediate II (of Example 10).

(B) 9-chloro-3-ethyl-2-methyl-7-(2,6-difluorophenyl(Pyrimido-[1,2-a][1,4]benzodiazepin-1(5H)-one In the manner given in Example 1B, N-acetoacetyl intermediate II (of Example 10) was condensed by refluxing in toluene to give 9-chloro-3-ethyl-2-methyl-7-(2,6-difluorophenyl)pyrimido[1,2-a][1,4]benzodiazepin-1(5H)-one.

EXAMPLE 11

9,10 - dicyano - 3 - butyl - 2 - propyl - 7 - [p - (methylsulfonyl)phenyl]pyrimidol[1,2 - a][1,4]benzodiazepin-1(5H)-one (A) N-acetoacetyl intermediate II (of Example 11)

In the manner given in Example 1A, 2-amino-7,8-dicyano - 5 - [p - (methylsulfonyl)phenyl]-3H-1,4-benzodiazepine and 4-butylidene-3-propyl-2-oxetanone in tetrahydrofuran was reacted at room temperature to give N-acetoacetyl intermediate II (of Example 11).

(B) 9,10-dicyano-3-butyl-2-propyl-7-[p-(methylsulfonyl)phenyl]pyrimido[1,2-a][1,4]benzodiazepin-1(5H)-one In the manner given in Example 1B, N-acetoacetyl intermediate II (of Example 11) was condensed by refluxing in toluene to give 9,10-dicyano-3-butyl-2-propyl-7 - [p - (methylsulfonyl)phenyl]pyrimido[1,2 - a][1,4]benzodiazepin-1(5H)-one.

EXAMPLE 12

3 - benzyl - 2 - phenyl - 9,11 - bis(dipropylamino) - 7- (o - nitrophenyl)pyrimido[1,2 - a][1,4]benzodiazepin-1(5H)-one (A) N-acetoacetyl intermediate II (of Example 12)

In the manner given in Example 1A, 2-amino-7,9-bis-(dipropylamino) - 5 - (o - nitrophenyl) - 3H-1,4-benzodiazepine and 4-benzylidene-3-phenyl-2-oxetanone in tetrahydrofuran was reacted at room temperature to give N-acetoacetyl intermediate II (of Example 12).

(B) 3-benzyl-2-phenyl-9,11-bis(dipropylamino)-7-(o-nitrophenyl)-pyrimido[1,2-a][1,4]benzodiazepin-1(5H)-one In the manner given in Example 1B, N-acetoacetyl intermediate II (of Example 12) was condensed by refluxing in toluene to give 3-benzyl-2-phenyl-9,11-bis(dipropylamino) - 7 - (o - nitrophenyl)pyrimido[1,2-a][1,4]benzodiazepin-1(5H)-one.

EXAMPLE 13

3 - phenethyl - 2 - benzyl - 8 - chloro - 7 - (m - bromophenyl)pyrimido[1,2 - a][1,4]benzodiazepin - 1(5H)-one (A) N-acetoacetyl intermediate II (of Example 13)

In the manner given in Example 1A, 2-amino-6-chloro-5 - (m - bromophenyl) - 3H-1,4-benzodiazepine and 4-phenethylidene - 3 - benzyl - 2 - oxetanone in tetrahydrofuran was reacted at room temperature to give N-acetoacetyl intermediate II (of Example 13).

(B) 3-phenethyl-2-benzyl-8-chloro-7-[(m-bromophenyl)pyrimido]-[1,2-a][1,4]benzodiazepin-1(5H)-one In the manner given in Example 1B, N-acetoacetyl intermediate II (of Example 13) was condensed by refluxing in toluene to give 3-phenethyl-2-benzyl-8-chloro-7 - (m - bromophenyl)pyrimido[1,2-a][1,4]benzodiazepin-1(5H)-one.

EXAMPLE 14

3-propyl-2-ethyl-9-methylsulfinyl-7-(o-fluorophenyl)pyrimido[1,2-a][1,4]benzodiazepin-1(5H)-one (A) N-acetoacetyl intermediate II (of Example 14)

In the manner given in Example 1A, 2-amino-7-methylsulfinyl - 5 - (o - fluorophenyl) - 3H-1,4-benzodiazepine and 4-propylidene-3-ethyl-2-oxetanone in tetrahydrofuran was reacted at room temperature to give N-acetoacetyl intermediate II (of Example 14).

(B) 3-propyl-2-ethyl-9-methylsulfinyl-5-(o-fluorophenyl)pyrimido-[1,2-a][1,4]benzodiazepin-1(5H)-one In the manner given in Example 1B, N-acetoacetyl intermediate II (of Example 14) was condensed by refluxing in toluene to give 3-propyl-2-ethyl-9-methylsulfinyl - 5 - (o - fluorophenyl)pyrimido - [1,2-a][1,4]benzodiazepin-1(5H)-one.

EXAMPLE 15

3,5,8,10-tetramethyl-7-(o-chlorophenyl)pyrimido[1,2-a][1,4]benzodiazepin-1(5H)-one (A) N-acetoacetyl intermediate II (of Example 15)

In the manner given in Example 1A, 2-amino-3,6,8-trimethyl - 5 - (o - chlorophenyl) - 3H - 1,4 - benzodiazepine and diketene in tetrahydrofuran was reacted at room temperature to give N-acetoacetyl intermediate II (of Example 15).

(B) 3,5,8,10-tetramethyl-7-(o-chlorophenyl)pyrimido[1,2-a][1,4]benzodiazepin-1(5H)-one In the manner given in Example 1B, N-acetoacetyl intermediate II (of Example 15) was condensed by refluxing in toluene to give 3,5,8,10-tetramethyl-7-(o-chlorophenyl)pyrimido[1,2 - a][1,4]benzodiazepin - 1(5H)-one.

EXAMPLE 16

3 - benzyl - 2 - phenyl - 11 - trifluoromethyl - 7 - [p-(propionylamino)phenyl]pyrimido[1,2 - a][1,4]benzodiazepin-1(5H)-one (A) N-acetoacetyl intermediate II (of Example 16)

In the manner given in Example 1A, 2-amino-9-trifluoromethyl - 5 - [p - (propionylamino)phenyl]-3H-1,4-benzodiazepine and 4-benzylidene-3-phenyl-2-oxetanone in tetrahydrofuran was reacted at room temperature to give N-acetoacetyl intermediate II (of Example 16).

(B) 3-benzyl-2-phenyl-11-trifluoromethyl-7-[p-(propionylamino)phenyl]pyrimido[1,2-a][1,4]benzodiazepin-1(5H)-one In the manner given in Example 1B, N-acetoacetyl intermediate II (of Example 16) was condensed by refluxing in toluene to give 3-benzyl-2-phenyl-11-trifluoromethyl - 7 [p - (propionylaminophenyl)pyrimido[1,2-a][1,4]benzodiazepin-1(5H)-one.

EXAMPLE 17

3 - benzyl - 2 - phenyl - 11 - trifluoromethyl - 7 - [p-(propionylamino)phenyl]pyrimido[1,2 - a][1,4]benzodiazepine-1(5H)-thione In the manner given in Example 2, 3-benzyl-2-phenyl-11 - trifluoromethyl - 7 - [p - (propionylamino)phenyl]pyrimido[1,2-a][1,4]benzodiazepin - 1(5H) - one in dry pyridine was heated with phosphorus pentasulfide in nitrogen for 18 hours to give 3-benzyl-2-phenyl-11-trifluoromethyl - 7 - [p - (propionylamino)phenyl]-pyrimido[1,2-a][1,4]benzodiazepine-1(5H)-thione.

EXAMPLE 18

3 - benzyl - 2 - phenyl - 11 - trifluoromethyl - 7 - [p-(propionylamino)phenyl]pyrimido[1,2 - a][1,4]benzodiazepin-1(5H)-imine In the manner given in Example 3, 3-benzyl-2-phenyl-11 - trifluoromethyl - 7 - [p - (propionylamino)phenyl]pyrimido[1,2 - a][1,4]benzodiazepine-1(5H)-thione was stirred in methanol saturated with ammonia gas at room temperature for 3 hours to give 3-benzyl-2-phenyl-11-trifluoromethyl - 7 - [p-(propionylamino)phenyl]pyrimido-[1,2-a][1,4]benzodiazepin-1(5H)-imine.

EXAMPLE 19

3-benzyl - 5 - hydroxy-2-phenyl-11-trifluoromethyl-7-[p-propionylamino)phenyl]pyrimido[1,2 - a][1,4]benzodiazepin-1[5H]-one (A) 3 - benzyl - 2 - phenyl-11-trifluoromethyl-7-[p-(propionylamino)phenyl]pyrimido[1,2-a][1,4]benzodiazepin - 1(5H)-one 6-oxide In the manner given in Example 4,3-benzyl-2-phenyl-11-trifluoromethyl - 7 - [p-propionylamino)phenyl]pyrimido[1,2-a][1,4]benzodiazepin - 1(5H) - one was treated with p-pertoluic acid in ethanol at room temperature (22–25° C.) to give 3-benzyl-2-phenyl-11-trifluoromethyl-7-[p-(propionylamino)phenyl]pyrimido - [1,2 - a][1,4]benzodiazepin-1(5H)-one 6-oxide.

(B) 3 - benzyl - 5 - hydroxy-2-phenyl-11-trifluoromethyl-7-[p-(propionylamino)phenyl]pyrimido[1,2 - a][1,4]benzodiazepin-1(5H)-one acetate In the manner given in Example 5,3-benzyl-2-phenyl-11 - trifluoromethyl - 7 - [p-(propionylamino)phenyl]pyrimido[1,2-a][1,4]benzodiazepin-1(5H)-one 6-oxide was warmed in a mixture of acetic anhydride and acetic acid to give 3-benzyl-5-hydroxy-2-phenyl-11-trifluoromethyl-7-[p-propionylamino)phenyl]pyrimido[1,2 - a][1,4]benzodiazepin-1(5H)-one acetate.

(C) 3 - benzyl - 5 - hydroxy-2-phenyl-11-trifluoromethyl-7-[p-(propionylamino)phenyl]pyrimido[1,2 - a][1,4]benzodiazepin-1(5H)-one In the manner given in Example 6,3-benzyl-5-hydroxy-2-phenyl - 11 - trifluoromethyl - 7 - [p-propionylamino)phenyl]pyrimido[1,2 - a][1,4]benzodiazepin - 1(5H)-one acetate was stirred with aqueous ethanolic potassium carbonate to give 3-benzyl-5-hydroxy-2-phenyl-11-trifluoromethyl - 7 - [p-(propionylamino)phenyl]pyrimido[1,2-a][1,4]benzodiazepin-1(5H)-one.

EXAMPLE 20

3 - benzyl - 5 - acetoxy - 2 - phenyl - 11 - trifluoromethyl - 7 - [p - (propionylamino)phenyl]pyrimido[1,2-a][1,4]-benzodiazepine-1-(5H)-thione In the manner given in Example 2,3-benzyl-5-acetoxy-2-phenyl - 11 - trifluoromethyl - 7 - [p-(propionylamino)-phenyl]pyrimido[1,2-a][1,4]benzodiazepin-1(5H)-one in dry pyridine was heated with phosphorus pentasulfide in nitrogen for 15 hours to give 3-benzyl-5-acetoxy-2-phenyl-11 - trifluoromethyl - 7 - [p-propionylamino)phenyl]pyrimido[1,2-a][1,4]benzodiazepine-1(5H)-thione.

EXAMPLE 21

3 - benzyl - 5 - acetoxy - 2 - phenyl - 11 - trifluoromethyl-7 - [p - (propionylamino)phenyl]pyrimido[1,2-a[1,4]-benzodiazepin-3(5H)-imine In the manner given in Example 3, 3-benzyl-5-acetoxy-2 - phenyl - 11 - trifluoromethyl-7-[p-propionylamino)-phenyl]pyrimido[1,2 - a][1,4]benzodiazepin - 1(5H)-thione was stirred in ethanol saturated with ammonia at about 20–22° C. to give 3-benzyl-5-acetoxy-2-phenyl-11-trifluoromethyl - 7 - (p - (propionylamino)phenyl]-pyrimido]1,2-a][1,4[benzodiazepin-1(5H)-imine.

EXAMPLE 22

3 - benzyl - 5 - hydroxy - 2 - phenyl - 11 - trifluoromethyl-7 - [p - (propionylamino)phenyl]pyrimido[1,2-a][1,4]-benzodiazepin-1(5H)-thione In the manner given in Example 2,3-benzyl-5-hydroxy-2 - phenyl - 11 - trifluoromethyl - 7 - [p - (propionylamino)phenyl]pyrimido[1,2 - a][1,4]benzodiazepin - 1(5H)-one in dry pyridine was heated with phosphorus pentasulfide in nitrogen for 18 hours to give 3-benzyl-5-hydroxy - 2 - phenyl-11-trifluoromethyl-7-[p-(propionylamino)phenyl]pyrimido[1,2 - a][1,4]benzodiazepine - 1-(5H)-thione.

EXAMPLE 23

3 - benzyl - 5 - hydroxy - 2 - phenyl - 11 - trifluoromethyl - 7 - [p - (propionylamino)phenyl]pyrimido[1,2][1,4]-benzodiazepin-1(5H)-imine In the manner given in Example 3,3-benzyl-5-hydroxy-2 - phenyl - 11 - trifluoromethyl - 7 - [p - (propionylamino)phenyl]pyrimido[1,2 - a][1,4]benzodiazepin - 1-(5H)-thione was stirred in methanol saturated with ammonia gas to give 3-benzyl-5-hydroxy-2-phenyl-11-trifluoromethyl - 7 - [p - (propionylamino)phenyl]pyrimido-[1,2-a][1,4]benzodiazepin-1(5H) imine.

EXAMPLE 24

3-methyl-8-methoxy-7-(2,4-diethoxyphenyl)pyrimido-[1,2-a][1,4]benzodiazepin-1(5H)-one (A) N-acetoacetyl intermediate II (of Example 24)

In the manner given in Example 1A, 2-amino-6-methoxy-5-(2,4-diethoxyphenyl)-3H-1,4-benzodiazepine and diketene in tetrahydrofuran was reacted at room temperature to give N-acetoacetyl intermediate II (of Example 24).

(B) 3-methyl-8-methoxy-7-(2,4-diethoxyphenyl)pyrimido[1,2-a][1,4]benzodiazepin-1(5H)-one In the manner given in Example 1B, N-acetoacetyl intermediate II (of Example 24) was condensed by refluxing in toluene to give 3-methyl-8-methoxy-7-(2,4-diethoxyphenyl)pyrimido[1,2-a][1,4]benzodiazepin-1(5H)-one.

EXAMPLE 25

11 - sulfonamido - 3 - ethyl - 2 - methyl - 7 - [(p-trifluoromethyl)phenyl]pyrimido[1,2 - a][1,4]benzodiazepin - 1(5H)-one (A) N-acetoacetyl intermediate II (of Example 25)

In the manner given in Example 1A, 2-amino-9-sulfonamido - 5 - [p-(trifluoromethyl)phenyl]-3H-1,4-benzodiazepine and 4-ethylidene-3-methyl-2-oxetanone in tetrahydrofuran was treated at room temperature to give N-acetoacetyl intermediate II (of Example 25).

(B) 11-sulfonamido-3-ethyl-2-methyl-7-[p-(trifluoromethyl)phenyl]pyrimido[1,2-a][1,4]benzodiazepin-1(5H)-one In the manner given in Example 1B, N-acetoacetyl intermediate II (of Example 25) was condensed by refluxing in toluene to give 11-sulfonamido-3-ethyl-2-methyl - 7 - [p-(trifluoromethyl)phenyl]-pyrimido[1,2-a][1,4]benzodiazepin-1(5H)-one.

In the manner given in Examples 1A and 1B treating a 2-aminobenzodiazepine I with diketene or a substituted diketene to give the corresponding N-aminoacetoacetyl intermediate II which by heating give the corresponding 7-phenylpyrimido[1,2 - a][1,4]benzodiazepin-1(5H)-ones III. Representative compounds of Formula III include:

3-methyl-9-amino-7-[(p-dipropylaminophenyl)pyrimido] [1,2-a][1,4]benzodiazepin-1(5H)-one;
3-ethyl-2-methyl-10-chloro-7-phenylpyrimido[1,2-a] [1,4]benzodiazepin-1(5H)-one;
3-propyl-2-ethyl-8-chloro-7-(m-bromophenyl)pyrimido [1,2-a][1,4]benzodiazepin-1(5H)-one;
3-butyl-2-propyl-9-chloro-7-(3,4-dimethylphenyl)pyrimido[1,2-a][1,4]benzodiazepin-1(5H)-one;
3-benzyl-2-phenyl-7-phenylpyrimido[1,2-a][1,4]benzodiazepin-1(5H)-one;
3-phenethyl-2-phenyl-9-bromo-7-phenylpyrimido[1,2-a] [1,4]benzodiazepin-1(5H)-one;
3-methyl-7-[(2-methyl-4-methoxy)phenyl]pyrimido[1,2-a] [1,4]benzodiazepin-1(5H)-one;
3-propyl-2-ethyl-11-bromo-7-phenylpyrimido[1,2-a][1,4] benzodiazepin-1(5H)-one;
3-ethyl-9-methyl-7-phenylpyrimido[1,2-a][1,4]benzodiazepin-1(5H)-one;
3-benzyl-2-phenyl-9-cyano-7-phenylpyrimido[1,2-a][1,4] benzodiazepin-1(5H)-one;
3-butyl-2-propyl-10-cyano-7-phenylpyrimido[1,2-a][1,4] benzodiazepin-1(5H)-one;
3-propyl-2-ethyl-9-chloro-7-(o-chlorophenyl)pyrimido [1,2-a][1,4]benzodiazepin-1(5H)-one:
3-phenethyl-2-benzyl-8-ethylthio-7-(o-bromophenyl) pyrimido[1,2-a][1,4]benzodiazepin-1(5H)-one;
3-ethyl-2-methyl-8,10-dichloro-7-(o-fluorophenyl)pyrimido[1,2-a][1,4]benzodiazepin-1(5H)-one;
3-methyl-10-propoxy-9-bromo-7-[m-(ethylsulfinyl)phenyl]pyrimido[1,2-a][1,4]benzodiazepin-1(5H)-one;
3-benzyl-2-phenyl-11-diisopropylamino-9-methyl-7-[m-(propylsulfonyl)phenyl]pyrimido[1,2-a][1,4] benzodiazepin-1(5H)-one;
3-propyl-2-methyl-9-iodo-7-(o-fluorophenyl)pyrimido [1,2-a][1,4]benzodiazepin-1(5H)-one;
3-butyl-2-propyl-5-methyl-7-(o-fluorophenyl)pyrimido [1,2-a][1,4]benzodiazepin-1(5H)-one;
3-phenethyl-2-benzyl-10-amino-7-(o-chlorophenyl)pyrimido[1,2-a][1,4]benzodiazepin-1(5H)-one;
3-methyl-9-bromo-7-(o-bromophenyl)pyrimido[1,2-a] [1,4]benzodiazepin-1(5H)-one;
3-benzyl-2-phenyl-9-dimethylamino-7-phenylpyrimido [1,2-a][1,4]benzodiazepin-1(5H)-one;
3-ethyl-2-methyl-8,11-dichloro-7-(p-isopropylphenyl) pyrimido[1,2-a][1,4]benzodiazepin-1(5H)-one;
3-propyl-2-ethyl-8,10-diethyl-7-(m-ethylphenyl)pyrimido [1,2-a][1,4]benzodiazepin-1(5H)-one;
3-benzyl-2-phenyl-8-nitro-7-(p-cyanophenyl)pyrimido [1,2-a][1,4]benzodiazepin-1(5H)-one;
3-phenethyl-2-benzyl-11-acetylamino-7-(p-cyanophenyl) pyrimido[1,2-a][1,4]benzodiazepin-1(5H)-one;

and the like.

Treatment of these 1-keto compounds with phosphorus pentasulfide as in Example 2, gives the corresponding thiones of the compounds above (compounds of Formula IV).

Treatment of these compounds IV with ammonia saturated methanol or ethanol as shown in Example 3, gives the corresponding 1-imino compounds of Formula V.

Treatment of the compounds of Formula III above, which have only hydrogen in the 5-position (compounds IIIA) with an organic peracid (Example 4) gives the N-oxides VI of these compounds. Such N-oxides by treatment with acetic anhydride (Example 5) give the 5-acetoxy compounds (VII) of compounds of Formula IIIa; which by saponification give the 5-hydroxy analogues VIII. Both compounds VII and VIII can be converted to the thione and imines as shown in Examples 20–23, inclusive.

What is claimed is:
1. A 3 - alkyl - 7 - phenylpyrimido[1,2-a][1,4]benzodiazepin-1(5H)-one of the Formula IX:

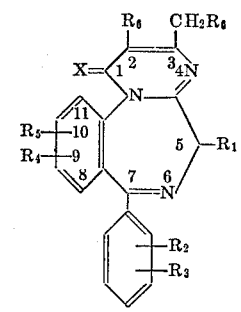

IX wherein $R_1$ is hydrogen, alkyl of 1 to 3 carbon atoms, inclusive, hydroxy or acetoxy; wherein $R_2$, $R_3$, $R_4$ and $R_5$ is hydrogen, halogen, nitro, cyano, trifluoromethyl, sulfonamido, amino, alkyl, alkoxy, alkylthio, alkylsulfinyl, alkylsulfonyl, alkanoylamino or dialkylamino in which the carbon moiety is of 1 to 5 carbon atoms, inclusive, per alkane radical; wherein $R_6$ is hydrogen, alkyl defined as above, phenyl or benzyl; and wherein X is oxygen, sulfur or =NH, and their pharmaceutically acceptable acid addition salts.

2. The product of claim 1 wherein $R_1$ is hydrogen, alkyl of 1 to 3 carbon atoms, inclusive, hydroxy or acetoxy; wherein $R_2$, $R_3$, $R_4$ and $R_5$ is hydrogen, halogen, nitro, cyano, trifluoromethyl, sulfonamido, amino, alkyl, alkoxy, alkylthio, alkylsulfinyl, alkylsulfonyl, alkanoylamino or dialkylamino in which the carbon moiety is of 1 to 3 carbon atoms, inclusive, per alkane radical; wherein $R_6$ is hydrogen, alkyl defined as above, phenyl or benzyl; and wherein X is oxygen.

3. The compound of claim 2 wherein $R_1$, $R_2$, $R_3$, $R_5$, and $R_6$ are hydrogen and $R_4$ is 9-chloro and the compound is therefore 9-chloro-3-methyl-7-phenylpyrimido-[1,2-a][1,4]benzodiazepin-1(5H)-one.

4. 9-chloro - 3 - methyl - 7 - phenylpyrimido[1,2-a] [1,4]benzodiazepin-1(5H)-one 6-N-oxide.

5. The compounds of claim 2 wherein $R_1$, $R_3$, $R_5$, and $R_6$ are hydrogen; $R_2$ is o-chloro; $R_4$ is 9-chloro and the compound is therefore 9-chloro-3-methyl - 7 - (o-chlorophenyl)pyrimido[1,2-a][1,4]benzodiazepin-1(5H)-one.

6. The compound of claim 2, wherein $R_1$, $R_2$, $R_3$, $R_4$, and $R_6$ are hydrogen and $R_5$ is 9-nitro and the compound is therefore 3-methyl-9-nitro-7-phenylpyrimido[1,2-a] [1,4]benzodiazepin-1(5H)-one.

7. The product of claim 1 wherein $R_1$ is hydrogen, alkyl of 1 to 3 carbon atoms, inclusive, hydroxy or acetoxy; wherein $R_2$, $R_3$, $R_4$, and $R_5$ is hydrogen, halogen, nitro, cyano, trifluoromethyl, sulfonamido, amino, alkyl, alkoxy, alkylthio, alkylsulfinyl, alkylsulfonyl, alkanoylamino or diakyamino in which the carbon moiety is of 1 to 3 carbon atoms, inclusive, per alkane radical; wherein $R_6$ is hydrogen, alkyl defined as above, phenyl or benzyl; and wherein X is sulfur.

8. A compound according to claim 7 wherein $R_1$, $R_2$, $R_3$, $R_5$, and $R_6$ are hydrogen, $R_4$ is 9-chloro and X is sulfur and the compound is therefore 9-chloro-3-methyl-7-phenylpyrimido[1,2-a][1,4]benzodiazepine - 1 - (5H)-thione.

9. The product of claim 1 wherein $R_1$ is hydrogen, alkyl of 1 to 3 carbon atoms, inclusive, hydroxy or acetoxy; wherein $R_2$, $R_3$, $R_4$, and $R_5$ is hydrogen, halogen, nitro, cyano, trifluoromethyl, sulfonamido, amino, alkyl alkoxy, alkylthio, alkylsulfinyl, alkylsulfonyl, alkanoylamino or dialkylamino in which the carbon moiety is of 1 to 3 carbon atoms, inclusive, per alkane radical; wherein $R_6$ is hydrogen, alkyl defined as above, phenyl or benzyl; and wherein X is =NH.

10. A process for the production of a 3-alkyl-7-phenyl-pyrimido[1,2-a][1,4]benzodiazepin - 1(5H) - one of the Formula III:

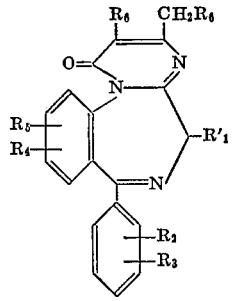

wherein $R_1'$ is hydrogen or alkyl of 1 to 3 carbon atoms, inclusive; wherein $R_2$, $R_3$, $R_4$, and $R_5$ is hydrogen, halogen, nitro, cyano, trifluoromethyl, sulfonamido, amino, alkyl, alkoxy, alkylthio, alkylsulfinyl, alkylsulfonyl, alkanoyamino or dialkyamino in which the carbon moiety is of 1 to 3 carbon atoms, inclusive, per alkane radical; and wherein $R_6$ is hydrogen, alkyl defined as above, phenyl or benzyl which comprises: treating a 2-amino-5-phenyl-3H-1,4-benzodiazepine of the Formula I:

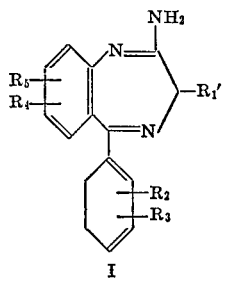

wherein $R_1'$, $R_2$, $R_3$, $R_4$, and $R_5$ are defined as above with a 2-oxetanone of the formula

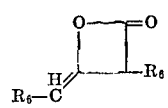

wherein R is hydrogen, alkyl of 1 to 3 carbon atoms, inclusive, phenyl and benzyl, to give the corresponding N-acetoacetyl intermediate II.

References Cited
UNITED STATES PATENTS 3,523,947   8/1970   Derieg et al. ____ 260—256.4 F RICHARD J. GALLAGHER, Primary Examiner U.S. Cl. X.R.

260—239 DB, 256.4 F, 343.9; 424—200, 251